United States Patent
Shigihara et al.

(10) Patent No.: US 12,270,433 B2
(45) Date of Patent: Apr. 8, 2025

(54) TILTING PAD BEARING

(71) Applicant: MITSUBISHI HEAVY INDUSTRIES COMPRESSOR CORPORATION, Tokyo (JP)

(72) Inventors: Takuzo Shigihara, Tokyo (JP); Chihiro Yoshimine, Tokyo (JP); Shinpei Yokoyama, Tokyo (JP); Yuki Kameyama, Tokyo (JP); Hideki Nagao, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 185 days.

(21) Appl. No.: 18/179,612

(22) Filed: Mar. 7, 2023

(65) Prior Publication Data
US 2023/0304532 A1 Sep. 28, 2023

(30) Foreign Application Priority Data
Mar. 28, 2022 (JP) .................... 2022-051784

(51) Int. Cl.
*F16C 17/03* (2006.01)

(52) U.S. Cl.
CPC .......... *F16C 17/03* (2013.01); *F16C 2360/23* (2013.01)

(58) Field of Classification Search
CPC ....... F16C 17/03; F16C 17/06; F16C 32/0666
See application file for complete search history.

(56) References Cited

U.S. PATENT DOCUMENTS

| | | | |
|---|---|---|---|
| 3,004,804 A | 10/1961 | Oscar et al. | |
| 3,351,394 A | 11/1967 | Hooker | |
| 3,791,703 A | 2/1974 | Ifield | |
| 7,066,651 B2 * | 6/2006 | Nicholas | F16C 27/02 384/99 |
| 10,590,984 B2 * | 3/2020 | Koch | F16C 17/03 |
| 2013/0188895 A1 | 7/2013 | Devitt | |
| 2019/0010977 A1 | 1/2019 | Shigihara et al. | |
| 2020/0277985 A1 | 9/2020 | Yoshimine et al. | |

FOREIGN PATENT DOCUMENTS

| | | |
|---|---|---|
| JP | 3098421 B2 | 10/2000 |
| JP | 2008-138850 A | 6/2008 |
| JP | 2019-082233 A | 5/2019 |
| JP | 6562953 B2 | 8/2019 |
| JP | 6709061 B2 | 6/2020 |

\* cited by examiner

*Primary Examiner* — James Pilkington
(74) *Attorney, Agent, or Firm* — Osha Bergman Watanabe & Burton LLP (57) ABSTRACT

A tilting pad bearing includes a plurality of pads slidably supporting an outside surface of a rotor shaft, a housing covering the plurality of pads, a support portion swingably supporting the pad with respect to the housing, and a fluid supply unit configured to supply a fluid to a pad surface. The support portion includes a pivot having a pad support surface in contact with a pad outside surface and a pivot curved surface facing and protruding toward a side opposite to the pad support surface, a liner having a first liner surface in contact with the pivot curved surface, and a biasing member biasing the liner toward the pivot with respect to the housing.

7 Claims, 6 Drawing Sheets

TILTING PAD BEARING

CROSS-REFERENCE TO RELATED APPLICATIONS

This application claims the benefit of priority to Japanese Patent Application Number 2022-051784 filed on Mar. 28, 2022. The entire contents of the above-identified application are hereby incorporated by reference.

TECHNICAL FIELD

The disclosure relates to a tilting pad bearing.

RELATED ART

For example, a rotary machine including a gas turbine, a steam turbine, or a centrifugal compressor includes a rotor shaft that rotates about an axis and a casing that surrounds the rotor shaft from the outside. The rotor shaft is rotatably supported by a bearing device. As such a bearing device, a journal bearing that supports a load in a radial direction of the rotor shaft and a thrust bearing that supports a load in an axial direction of the rotor shaft are widely used. As the journal bearing, a tilting pad bearing including a plurality of pads is known.

For example, JP 2019-82233 A describes a tilting pad bearing including a pad, a liner that supports the pad, and a pivot that makes the pad swingable.

SUMMARY

In the tilting pad bearing, there is a case where it is necessary to increase the rigidity of the bearing in order to improve the stability of the rotor shaft and reduce the axial vibration. In order to increase the rigidity of the bearing, it is necessary to assemble the bearing with a small radial gap between the pad and the rotor shaft when assembling the bearing. On the other hand, a small gap between the pad and the rotor shaft increases heat generated by friction between the pad and the rotor shaft when the rotor shaft rotates. As a result, the pad and the rotor shaft are thermally expanded, and there is a high possibility that the pad and the rotor shaft are in direct contact with each other. In order to avoid such contact, there is an idea of a structure in which a pad is biased toward a rotor shaft by a spring to apply pressure, meanwhile, at the time of expansion of the pad or the rotor shaft, the pad is movable so as to be separated from the rotor shaft by the spring.

However, in such a structure, the pad is in contact with the rotor shaft at a start time at which rotation is started from a state where the rotor shaft is completely stopped. Therefore, in order to avoid contact between the pad and the rotor shaft at the start time, there is a case where a fluid such as gas or oil is supplied between the pad and the rotor shaft, and the pad is floated so as to be separated from the rotor shaft by static pressure. In this case, it is necessary to achieve both a structure that enables supply of a fluid such as gas or oil to the pad and a structure that biases the pad toward the rotor shaft.

The disclosure has been made to solve the above problems, and an object of the disclosure is to provide a tilting pad bearing capable of achieving, with a simple structure, both a structure that enables supply of a fluid to the pad and a structure that biases the pad toward a rotor shaft.

In order to solve the above problems, a tilting pad bearing according to the disclosure includes: a plurality of pads including a pad surface slidably supporting an outside surface of a rotor shaft that rotates about an axis; a housing formed in an annular shape about the axis, covering the plurality of pads; a support portion disposed between the housing and the pads in a radial direction with reference to the axis and supporting the pads swingably with respect to the housing; and a fluid supply unit configured to supply a fluid from an outside of the housing to the pad surface, in which the pad includes a pad outside surface facing a side opposite to the pad surface in the radial direction, the housing includes a housing accommodating recess in which the support portion can be accommodated, the support portion includes a pivot including a pad support surface in contact with the pad outside surface and a pivot curved surface curved facing and protruding toward a side opposite to the pad support surface in the radial direction, a liner disposed between the housing and the pivot and including a first liner surface formed linearly and being in contact with the pivot curved surface, when viewed from a circumferential direction about the axis, and a biasing member disposed between the liner and the housing, biasing the liner toward the pivot with respect to the housing, and the fluid supply unit includes a pad flow channel formed, in the pad, opening on the pad surface, a pivot flow channel formed, in the pivot, communicating with the pad flow channel, and a housing flow channel formed, in the housing, communicating with the pivot flow channel.

According to the tilting pad bearing of the disclosure, it is possible to achieve, with a simple structure, both a structure that enables supply of a fluid to the pad and a structure that biases the pad toward a rotor shaft.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments for implementing a tilting pad bearing according to the disclosure will be described with reference to the accompanying drawings. However, the disclosure is not limited only to these embodiments.

First Embodiment

Configuration of Tilting Pad Bearing

Figure 1:
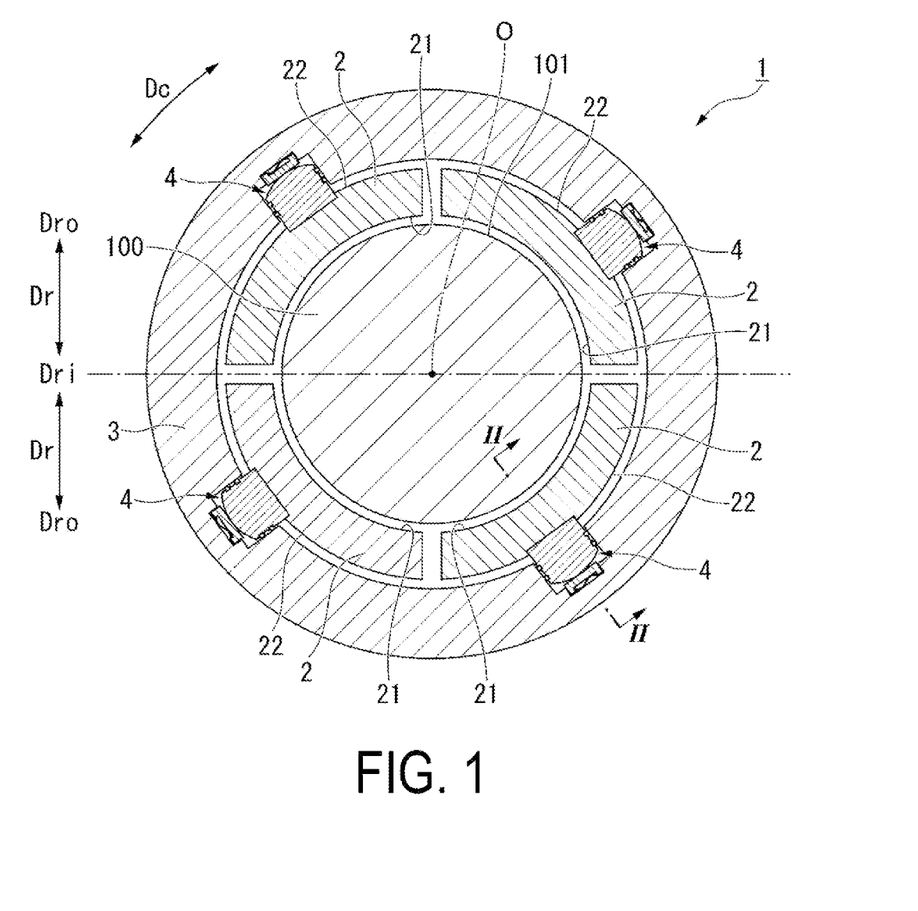
FIG. 1 is a cross-sectional view illustrating a schematic configuration of a tilting pad bearing according to an embodiment of the disclosure, viewed from an axial direction.

A tilting pad bearing 1 is a bearing for rotatably supporting a rotor shaft 100 of a rotary machine including, for example, a gas turbine, a steam turbine, or a compressor. The tilting pad bearing 1 is a device for supporting a load of the rotor shaft 100 from a radial direction Dr of the rotor shaft 100. As illustrated in FIG. 1, the tilting pad bearing 1 includes a pad 2, a housing 3, a support portion 4, a fluid supply unit 5 (see FIG. 2), and a seal member 44.

For convenience of the following description, a direction in which an axis O extends is defined as an axial direction Da in the rotor shaft 100 and the tilting pad bearing 1. The radial direction of the rotor shaft 100 and the tilting pad bearing 1 with reference to the axis O is simply defined a radial direction Dr. A side approaching the axis O in the radial direction Dr is defined as an inner side Dri in the radial direction Dr, and a side opposite to the inner side Dri in the radial direction Dr is defined as an outer side Dro in the radial direction Dr. The circumferential direction of the rotor shaft 100 and the tilting pad bearing 1 about the axis O is simply defined as a circumferential direction Dc.

Figure 2:
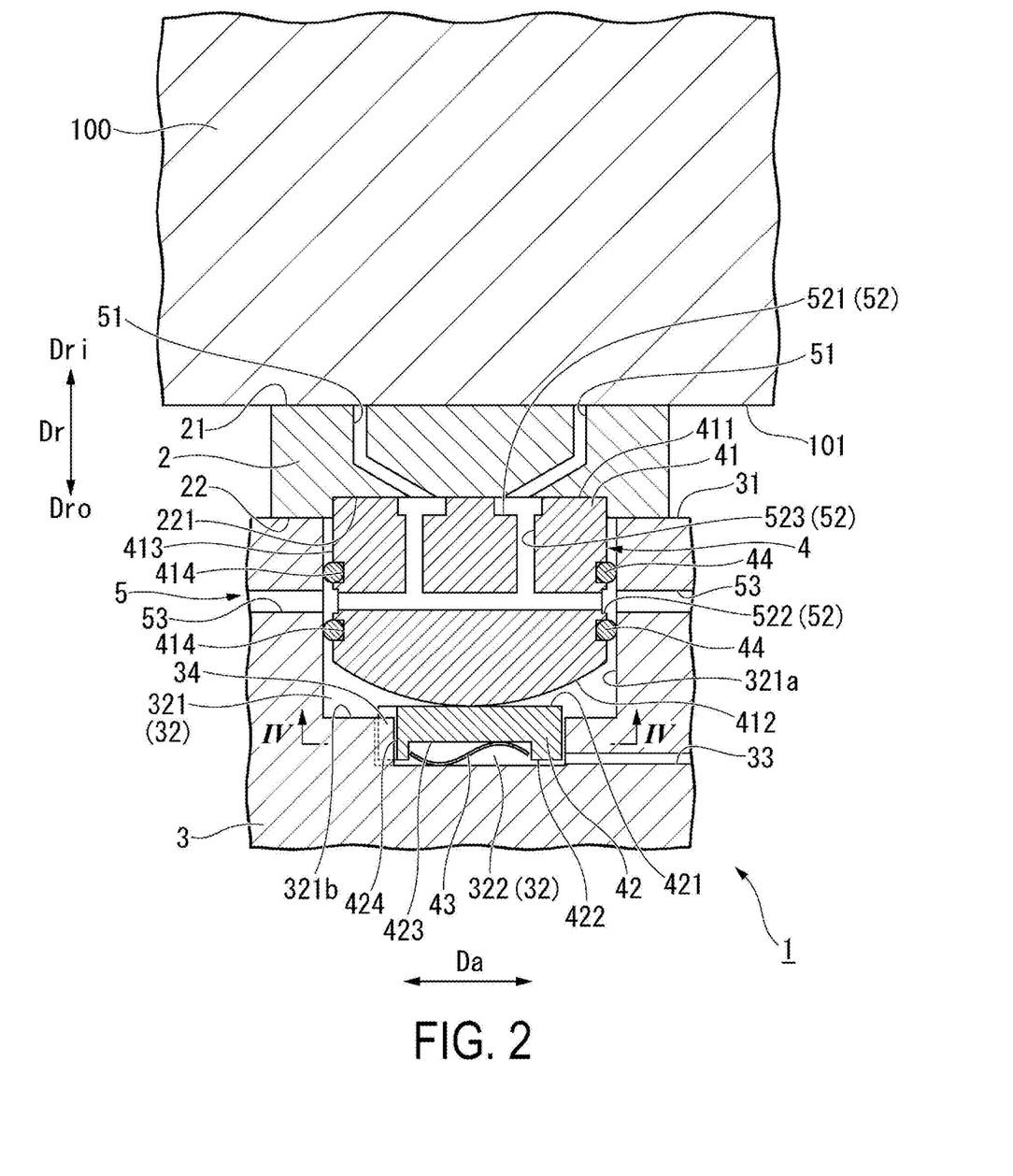
FIG. 2 is a cross-sectional view of a main part taken along line II-II (viewed from a circumferential direction) in FIG. 1 illustrating a configuration around a pad of a first embodiment.

A plurality (four in the present embodiment) of the pads 2 are arranged at intervals in the circumferential direction Dc along an outside surface 101 of the rotor shaft having a circular cross section about the axis O. Each pad 2 has a curved cross-sectional shape when viewed from the axial direction Da. Each pad 2 has the same shape. The pad 2 has a curvature corresponding to the shape of the outside surface 101 of the rotor shaft. In other words, the pad 2 extends in a curved manner in the circumferential direction Dc along the shape of the outside surface 101 of the rotor shaft. As illustrated in FIG. 2, the pad 2 of the present embodiment is swingably supported by the support portion 4 with respect to the housing 3. The pad 2 has a pad surface 21 and a pad outside surface 22.

The pad surface 21 is a surface of the pad 2 facing the inner side Dri in the radial direction Dr. The pad surface 21 is a surface slidably supporting the outside surface 101 of the rotor shaft that rotates about the axis O. The pad surface 21 opposes the outside surface 101 of the rotor shaft in the radial direction Dr. As illustrated in FIG. 1, the pad surface 21 is curved so as to be concave toward the outer side Dro in the radial direction Dr when viewed from the axial direction Da. The radius of curvature of the pad surface 21 is set to be the same as or slightly larger than the radius of curvature of the outside surface 101 of the rotor shaft. When a fluid (lubricating oil or gas) is supplied from the fluid supply unit 5 described below, the fluid is interposed between the pad surface 21 and the outside surface 101 of the rotor shaft in a state where the fluid forms a film.

The pad outside surface 22 is a surface of the pad 2 facing the outer side Dro in the radial direction Dr. That is, the pad outside surface 22 faces the side opposite to the pad surface 21 in the radial direction Dr. The pad outside surface 22 is curved so as to protrude toward the outer side Dro in the radial direction Dr when viewed from the axial direction Da. A central portion of the pad outside surface 22 in the circumferential direction Dc is supported by the support portion 4. As illustrated in FIG. 2, the pad outside surface 22 is provided with a pad recess 221 into which a pivot 41 described below is fitted.

As illustrated in FIG. 1, the housing 3 is formed in an annular shape about the axis O so as to cover the plurality of pads 2. The housing 3 of the present embodiment is a tubular member having an annular shape when viewed from the axial direction Da. The housing 3 is detachable to/from a casing (not illustrated) of the rotary machine. The housing 3 is connected with a pipe (not illustrated) for feeding a fluid supplied from an external supply source to the fluid supply unit 5. As illustrated in FIG. 2, the housing 3 of the present embodiment includes a housing inside surface 31, a housing accommodating recess 32, and a housing discharge flow path 33.

The housing inside surface 31 is a surface facing the inner side Dri in the radial direction Dr. The housing inside surface 31 opposes the pad outside surface 22 in the radial direction Dr. The housing inside surface 31 is disposed with a slight gap from the pad outside surface 22. The housing inside surface 31 is curved so as to be concave toward the outer side Dro in the radial direction Dr when viewed from the axial direction Da. The radius of curvature of the housing inside surface 31 is set to be the same as or slightly larger than the radius of curvature of the pad outside surface 22.

In the housing accommodating recess 32, the support portion 4 can be accommodated. The housing accommodating recess 32 is formed to be recessed in the outer side Dro of the radial direction Dr from the housing inside surface 31. The housing accommodating recess 32 includes a first accommodating recess 321 and a second accommodating recess 322.

The first accommodating recess 321 is recessed in a circular shape from the housing inside surface 31 toward the outer side Dro in the radial direction Dr. The first accommodating recess 321 is formed by a recess wall surface 321a facing the axial direction Da and a bottom surface 321b facing the inner side Dri in the radial direction Dr when viewed from the circumferential direction Dc. The second accommodating recess 322 is further recessed from the bottom surface 321b of the first accommodating recess 321 toward the outer side Dro in the radial direction Dr. The second accommodating recess 322 is formed in a circular shape smaller than the first accommodating recess 321 when viewed from the radial direction Dr.

The housing discharge flow path 33 discharges the fluid in the housing accommodating recess 32 to the outside of the housing 3. The housing discharge flow path 33 penetrates inside the housing 3 so as to cause the second accommodating recess 322 to communicate with the outside of the housing 3. The housing discharge flow path 33 of the present embodiment is opened in the second accommodating recess 322. The housing discharge flow path 33 is formed at the outermost side Dro in the radial direction Dr and at the lower end in the vertical direction in the second accommodating recess 322. Therefore, the fluid accumulated in the second accommodating recess 322 is discharged to the outside of the housing 3 via the housing discharge flow path 33.

As illustrated in FIG. 1, the support portion 4 supports the pad 2 swingably with respect to the housing 3. The support portion 4 is disposed between the housing 3 and the pad 2 in the radial direction Dr when viewed from the circumferential direction Dc. A plurality of the support portions 4 are arranged at intervals in the circumferential direction Dc such that one support portion 4 is arranged on one pad 2. As illustrated in FIG. 2, the support portion 4 of the present embodiment includes the pivot 41, a liner 42, a biasing member 43, and the seal member 44.

The pivot 41 is in contact with the pad outside surface 22. The pivot 41 is arranged in the first accommodating recess 321 such that a part thereof protrudes toward the pad 2. A protruding part of the pivot 41 of the present embodiment is fitted into the pad recess 221. The pivot 41 is formed in a columnar shape extending in the radial direction Dr. The pivot 41 has a pad support surface 411, a pivot curved surface 412, a pivot side surface 413, and a seal accommodating recess 414.

Figure 3:
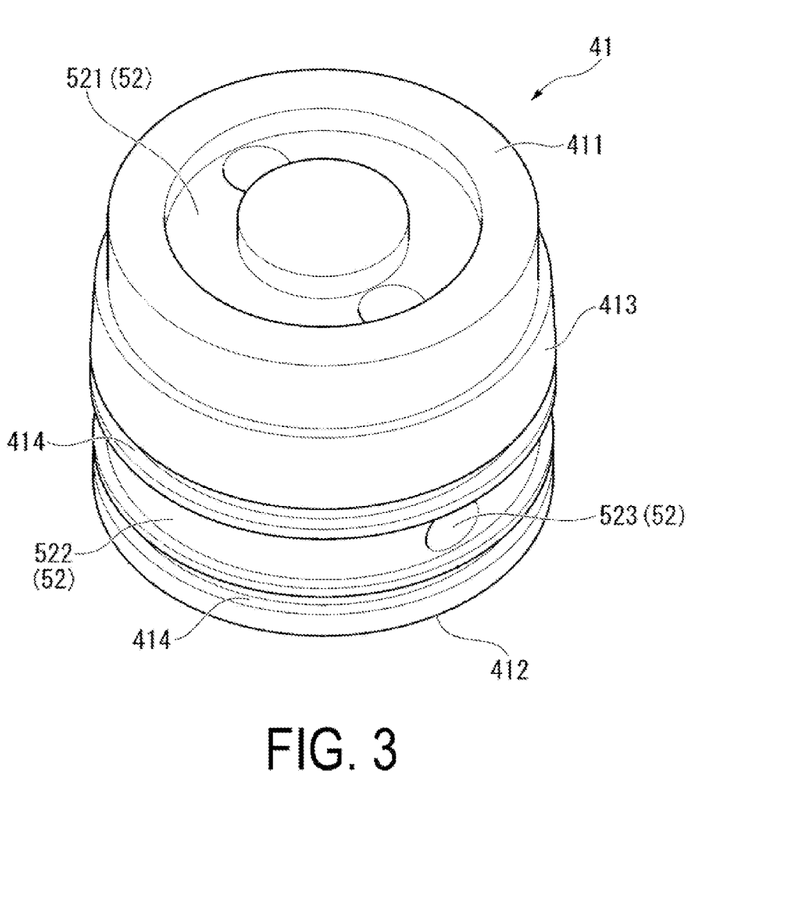
FIG. 3 is a perspective view illustrating a configuration of a pivot according to an embodiment of the disclosure.

The pad support surface 411 is an end surface facing the inner side Dri of the radial direction Dr in the pivot 41. The pad support surface 411 is a surface in contact with the pad outside surface 22. The pivot 41 is in surface contact with the pad outside surface 22 via the pad support surface 411 in the pad recess 221. As illustrated in FIG. 3, the pad support surface 411 is formed in an annular shape when viewed from the radial direction Dr.

As illustrated in FIG. 2, the pivot curved surface 412 is an end surface facing the outer side Dro of the radial direction Dr in the pivot 41. That is, the pivot curved surface 412 is curved so as to face and protrude toward the side opposite to the pad support surface 411 in the radial direction Dr when viewed from the circumferential direction Dc. The pivot curved surface 412 is curved such that the center in the axial direction Da is most convex toward the outer side Dro in the radial direction Dr when viewed from the circumferential direction Dc. The pivot curved surface 412 of the present embodiment is formed in a spherical shape. A central portion (most protruding portion) of the pivot curved surface 412 when viewed from the circumferential direction Dc is in contact with the liner 42.

The pivot side surface 413 is a surface facing a direction intersecting the pad support surface 411 and the pivot curved surface 412. The pivot side surface 413 is a curved surface formed in a cylindrical shape and extending in the radial direction Dr. The pivot side surface 413 opposes the recess wall surface 321a with a gap.

In the seal accommodating recess 414, the seal member 44 can be accommodated. The seal accommodating recess 414 is recessed from the pivot side surface 413. A plurality (two in the present embodiment) of the seal accommodating recesses 414 are formed apart in the radial direction Dr. The seal accommodating recess 414 is recessed in the axial direction Da when viewed from the circumferential direction Dc. One seal accommodating recess 414 is formed in a size allowing accommodation of only one seal member 44. As illustrated in FIG. 3, the seal accommodating recess 414 is formed to be continuous over the entire circumference of the pivot side surface 413 so as to form an annular shape when viewed from the radial direction Dr.

As illustrated in FIG. 2, the liner 42 is disposed between the housing 3 and the pivot 41. The liner 42 is disposed in the second accommodating recess 322 such that a part thereof protrudes toward the pivot 41. The liner 42 is in contact with the pivot curved surface 412. The liner 42 of the present embodiment is formed in a disk shape whose central axis extends in the radial direction Dr. The liner 42 is formed of a material harder than the pivot 41. The liner 42 is formed of, for example, a steel material or a stainless steel material. A coating for reducing friction may be applied to the outside surface of the liner 42. The liner 42 includes a first liner surface 421, a second liner surface 422, a liner accommodating recess 423, and a liner positioning recess 424.

The first liner surface 421 is an end surface facing the inner side Dri of the radial direction Dr in the liner 42. The first liner surface 421 is formed linearly when viewed from the axial direction Da and the circumferential direction Dc. The first liner surface 421 of the present embodiment is formed in a circular shape when viewed from the radial direction Dr. The first liner surface 421 is in contact with the pivot curved surface 412. The first liner surface 421 of the present embodiment is in point contact with the pivot curved surface 412 at one point when viewed from the axial direction Da or the circumferential direction Dc. The first liner surface 421 is not limited to being in point contact with the pivot curved surface 412, and is only required to be in contact with the pivot curved surface 412 at one point when viewed from the circumferential direction Dc. Thus, depending on the shape of the pivot curved surface 412, it may be in line contact. The first liner surface 421 of the present embodiment is disposed in the first accommodating recess 321 when viewed from the circumferential direction Dc.

The second liner surface 422 is an end surface facing the outer side Dro of the radial direction Dr in the liner 42. The second liner surface 422 is a surface facing the side opposite to the first liner surface 421 in the radial direction Dr when viewed from the circumferential direction Dc. The second liner surface 422 is formed linearly when viewed from the axial direction Da and the circumferential direction Dc. The second liner surface 422 of the present embodiment is formed in a circular shape when viewed from the radial direction Dr. The second liner surface 422 is disposed in the second accommodating recess 322 when viewed from the circumferential direction Dc.

In the liner accommodating recess 423, the biasing member 43 can be accommodated. The liner accommodating recess 423 is recessed from the second liner surface 422 in the radial direction Dr. The liner accommodating recess 423 is recessed in a circular shape from the second liner surface 422.

Figure 4:
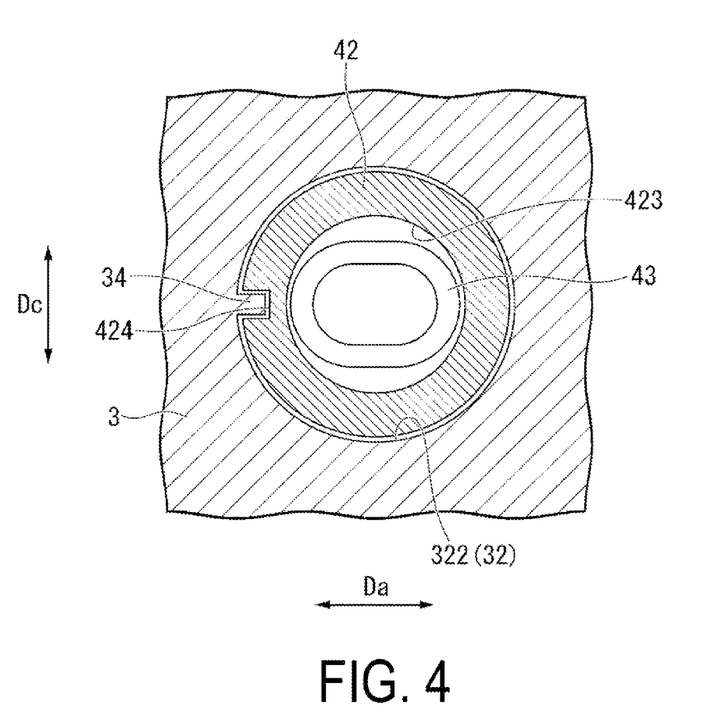
FIG. 4 is a cross-sectional view taken along line IV-IV (viewed from a radial direction) in FIG. 2 illustrating the relationship between a liner and a housing according to an embodiment of the disclosure.

The liner positioning recess 424 defines positioning of the liner 42 in the second accommodating recess 322 in the axial direction Da and the circumferential direction Dc. The liner positioning recesses 424 of the present embodiment can be inserted into a positioning protrusion 34 formed in the housing 3. The positioning protrusion 34 is formed in the second accommodating recess 322. As illustrated in FIG. 4, the positioning protrusion 34 protrudes in the axial direction Da from the inside surface of the second accommodating recess 322. The liner positioning recess 424 is recessed in a rectangular shape from the side surface of the liner 42 when viewed from the radial direction Dr. The liner positioning recess 424 is fitted into the positioning protrusion 34 from the radial direction Dr, thereby fixing the liner 42 in the second accommodating recess 322 in the axial direction Da and the circumferential direction Dc in a state of being immovable in the axial direction Da and the circumferential direction Dc.

As illustrated in FIG. 2, the biasing member 43 biases the liner 42 toward the pivot 41 with respect to the housing 3. The biasing member 43 is disposed between the liner 42 and the housing 3. The biasing member 43 of the present embodiment is disposed in the second accommodating recess 322 and the liner accommodating recess 423. The biasing member 43 is disposed such that the position where the pivot curved surface 412 and the first liner surface 421 are in contact with each other overlaps with the position in the axial direction Da when viewed from the circumferential direction Dc. The biasing member 43 is one disc spring accommodated in the liner accommodating recess 423. The biasing member 43 is disposed in a compressed state by the liner 42 and the housing 3, thereby biasing the liner 42 toward the inner side Dri in the radial direction Dr with respect to the housing 3.

The seal member 44 seals a gap between the recess wall surface 321a forming the housing accommodating recess 32 and the pivot side surface 413. A pair of the seal members 44 are disposed apart in the radial direction Dr. The seal member 44 is not limited to a pair, and two or more seal members may be disposed. When viewed from the circumferential direction Dc, the pair of seal members 44 are disposed in the housing accommodating recess 32 separately in the radial direction Dr with a pivot outer circumferential recess 522 described below between the seal members 44. Each of the pair of seal members 44 are fixed to the pivot 41 in a state of being accommodated in the seal accommodating recess 414. The seal member 44 of the present embodiment is an O-ring that can be disposed in close contact with the pivot side surface 413. The seal member 44 is inserted into the first accommodating recess 321 from the radial direction Dr together with the pivot 41, thereby being in sliding contact with the recess wall surface 321a. As a result, a space between the pivot side surface 413 and the recess wall surface 321a held between the pair of seal members 44 in the radial direction Dr is sealed.

The fluid supply unit 5 can supply a fluid to the pad surface 21 from an outside of the housing 3. The fluid supply unit 5 supplies lubricating oil or gas as fluid. The fluid supply unit 5 supplies the fluid from the outside to the pad surface 21 at the start time (start of operation of the rotary machine, or the like) in which rotation is started from a state where the rotor shaft 100 is completely stopped, or at rated operation of the rotary machine in which the rotor shaft 100 continues to rotate at a high speed. The fluid supply unit 5 of the present embodiment includes a pad flow channel 51, a pivot flow channel 52, and a housing flow channel 53.

The pad flow channel 51 is formed in the pad 2 so as to open on the pad surface 21. The pad flow channel 51 feeds the supplied fluid to the pad surface 21 through inside the pad 2. The pad flow channel 51 of the present embodiment extends from the pad outside surface 22 to the pad surface 21 so as to penetrate the pad 2 in the radial direction Dr. The pad flow channel 51 extends so as to bend in the pad 2. A plurality (for example, four) of pad flow channels 51 are equally spaced with respect to one pad 2. The pad flow channel 51 is opened on the pad surface 21 at a position where the position where the pivot curved surface 412 and the first liner surface 421 are in contact with each other overlaps with the position in the axial direction Da when viewed from the circumferential direction Dc.

The pivot flow channel 52 is formed in the pivot 41 in communication with the pad flow channel 51. The pivot flow channel 52 feeds the supplied fluid to the pad support surface 411 through inside the pivot 41. The pivot flow channel 52 of the present embodiment extends from the pivot side surface 413 to the pad support surface 411 so as to penetrate the pivot 41. The pivot flow channel 52 includes a pivot recess 521, a pivot outer circumferential recess 522, and a pivot internal flow channel 523.

As illustrated in FIGS. 2 and 3, the pivot recess 521 is recessed in the radial direction Dr from the pad support surface 411. The pivot recess 521 communicates with the pad flow channel 51 by being disposed in a state where the pad support surface 411 is in contact with the pad outside surface 22. The pivot recess 521 of the present embodiment is recessed from the pad support surface 411 in an annular shape when viewed from the radial direction Dr. Specifically, the pivot recess 521 is formed in an annular shape so that the position where the pivot curved surface 412 and the first liner surface 421 are in contact with each other overlaps with the position in the axial direction Da when viewed from the circumferential direction Dc are not recessed. The pivot recess 521 is formed such that a position overlapping the pad flow channel 51 opened on the pad outside surface 22 is recessed in a state where the pad support surface 411 is in contact with the pad outside surface 22 when viewed from the circumferential direction Dc.

The pivot outer circumferential recess 522 is recessed from the pivot side surface 413. The pivot outer circumferential recess 522 of the present embodiment is formed with an interval between two of the pivot outer circumferential recesses 522. The pivot outer circumferential recess 522 is formed at a position overlapping with the position where the opening of the pivot internal flow channel 523 is formed on the pivot side surface 413 when viewed from the circumferential direction Dc. The pivot outer circumferential recess 522 is continuous over the entire circumference of the pivot side surface 413. The pivot outer circumferential recess 522 is formed to be continuous over the entire circumference of the pivot side surface 413 in an annular shape when viewed from the radial direction Dr.

The pivot internal flow channel 523 is formed in the pivot 41 so as to cause the pivot recess 521 to communicate with the pivot side surface 413. The pivot internal flow channel 523 of the present embodiment causes the pivot recess 521 and the pivot outer circumferential recess 522 to communicate with each other. A plurality (for example, two) of the pivot internal flow channels 523 are opened in the pivot recess 521. A plurality (for example, two) of the pivot internal flow channels 523 are opened in the pivot outer circumferential recess 522. The pivot internal flow channel 523 is formed to penetrate the pivot 41 from the pivot recess 521 to the pivot outer circumferential recess 522.

The housing flow channel 53 is formed in the housing 3 so as to communicate with the pivot flow channel 52. The housing flow channel 53 feeds the fluid supplied through the external pipe to the recess wall surface 321a through inside the housing 3. That is, the housing flow channel 53 supplies the fluid toward the pivot side surface 413. The housing flow channel 53 of the present embodiment is opened to the recess wall surface 321a at a position where the position in the radial direction Dr overlaps with the pivot outer circumferential recess 522 when viewed from the circumferential direction Dc. That is, the opening of the recess wall surface 321a in the housing flow channel 53 is formed at a position opposing the pivot outer circumferential recess 522.

Operational Effects

In the tilting pad bearing 1 having the above configuration, the pivot curved surface 412 curved so as to protrude in the radial direction Dr is in contact with the linear first liner surface 421 when viewed from the axial direction Da and the circumferential direction Dc. As a result, the pivot 41 swings with respect to the liner 42 fixed to the housing 3. That is, the pivot 41 swings with respect to the housing 3. Therefore, the pad 2 supported with respect to the pivot 41 in a state where the pad outside surface 22 is in contact with the pad support surface 411 also swings with respect to the housing 3. Therefore, the pad 2 can be swingably supported with respect to the housing 3.

Here, in a case where the pivot 41 is directly biased by the biasing member 43 without arranging the liner 42, the pivot 41 cannot be swingably supported with respect to the housing 3. As a result, it is no longer possible to swing the pad 2 with respect to the housing 3. On the other hand, since the liner 42 is disposed between the biasing member 43 and the pivot 41, it is possible to swing the pivot 41 while biasing the pivot 41.

The biasing member 43 biases the liner 42 in the inner side Dri of the radial direction Dr with respect to the housing 3. As a result, the pivot 41 in contact with the liner 42 is also pressed against the inner side Dri in the radial direction Dr. Due to this, the pad outside surface 22 is pressed against the inner side Dri in the radial direction Dr by the pad support surface 411. As a result, the pad 2 is pressed against the rotor shaft 101 such that the pad surface 21 approaches the outside surface 100 of the rotor shaft. This can reduce a gap between the pad surface 21 and the outside surface 101 of the rotor shaft. This can increase the rigidity of the bearing, and improve the stability of the rotor shaft 100 and reduce the axial vibration. Therefore, a structure that biases the pad 2 toward the rotor shaft 100 can be obtained with a simple structure.

A fluid such as lubricating oil or gas supplied from the outside of the housing 3 is supplied to the pad surface 21 by the fluid supply unit 5. Therefore, at the start time, a fluid is present between the pad surface 21 and the outside surface 101 of the rotor shaft. Therefore, as compared with the state before the fluid is supplied, the pad surface 21 is separated from the outside surface 101 of the rotor shaft in the outer side Dro in the radial direction Dr by the interposition of the fluid. As a result, the pad surface 21 and the outside surface 101 of the rotor shaft are less likely to come into direct contact with each other, and wear and damage on the pad 2 and the rotor shaft 100 due to contact between the pad surface 21 and the outside surface 101 of the rotor shaft can be suppressed. Therefore, a structure that enables supply of a fluid to the pad 2 can be obtained with a simple structure. As described above, in the above-described tilting pad bearing 1, it is possible to achieve, with a simple structure, both a structure that enables supply of a fluid to the pad 2 and a structure that biases the pad 2 toward the rotor shaft 100.

Furthermore, the pivot flow channel 52 has the pivot recess 521 recessed from the pad support surface 411 and the pivot internal flow channel 523 formed inside the pivot 41 so as to cause the pivot recess 521 and the pivot side surface 413 to communicate with each other. Therefore, by the housing flow channel 53, the fluid supplied to the pivot side surface 413 can be supplied to the pad support surface 411 through inside the pivot 41. The fluid is supplied to the pivot recess 521 recessed from the pad support surface 411 in surface contact with the pad outside surface 22. Therefore, before being supplied to the pad flow channel 51, the fluid fills the pivot recess 521 without leaking from between the pad outside surface 22 and the pad support surface 411. As a result, the fluid is continuously supplied to the pad flow channel 51 at a stable pressure. This makes it possible to continue to stably supply the fluid between the pad surface 21 and the outside surface 101 of the rotor shaft.

The pair of seal members 44 are disposed with the pivot outer circumferential recess 522 therebetween. The pivot outer circumferential recess 522 is formed at a position overlapping with the opening of the pivot internal flow channel 523 on the pivot side surface 413. Therefore, the fluid supplied from the housing flow channel 53 to the pivot side surface 413 is fed to a space sealed by the pair of seal members 44. This makes it possible to suppress the fluid supplied from the housing flow channel 53 to the pivot side surface 413 from filling the pad support surface 411, the pivot curved surface 412, the liner 42, and surrounding of the biasing member 43 in the housing accommodating recess 32. This makes it possible to suppress the positional relationship among the pivot 41, the liner 42, and the biasing member 43 from displacing due to the fluid supplied from the housing flow channel 53 to the pivot side surface 413. Therefore, the pad 2 can be stably supported with respect to the housing 3.

Furthermore, since the housing discharge flow path 33 is formed, even when there is a fluid slightly leaking beyond the pair of seal members 44, the leaked fluid can be discharged to the outside of the housing 3. That is, it is possible to further prevent the fluid from being accumulated in the housing accommodating recess 32. This makes it possible to further suppress the positional relationship between the liner 42 and the biasing member 43 from displacing.

Since the biasing member 43 is accommodated in the liner accommodating recess 423, it is possible to prevent the biasing member 43 from falling off from the liner 42. This enables the biasing member 43 to be continuously retained between the liner 42 and the housing 3 in a stable orientation. Therefore, the biasing member 43 can continuously bias the pivot 41 in a stable state.

The biasing member 43 is a disc spring. Therefore, the biasing member 43 can be formed thin in the radial direction Dr, and a simpler structure can be obtained.

Furthermore, since the liner positioning recesses 424 can be inserted into the positioning protrusion 34 formed in the housing 3, the liner 42 is brought into a state of being immovable in the axial direction Da and the circumferential direction Dc in the second accommodating recess 322. This makes it possible to suppress rotation or inclination of the liner 42 in the second accommodating recess 322.

Second Embodiment

Next, the second embodiment of the tilting pad bearing according to the disclosure will be described. Note that in the following description of the second embodiment, common components with the first embodiment described above are given the same reference signs in the drawings and explanations thereof are omitted.

Figure 5:
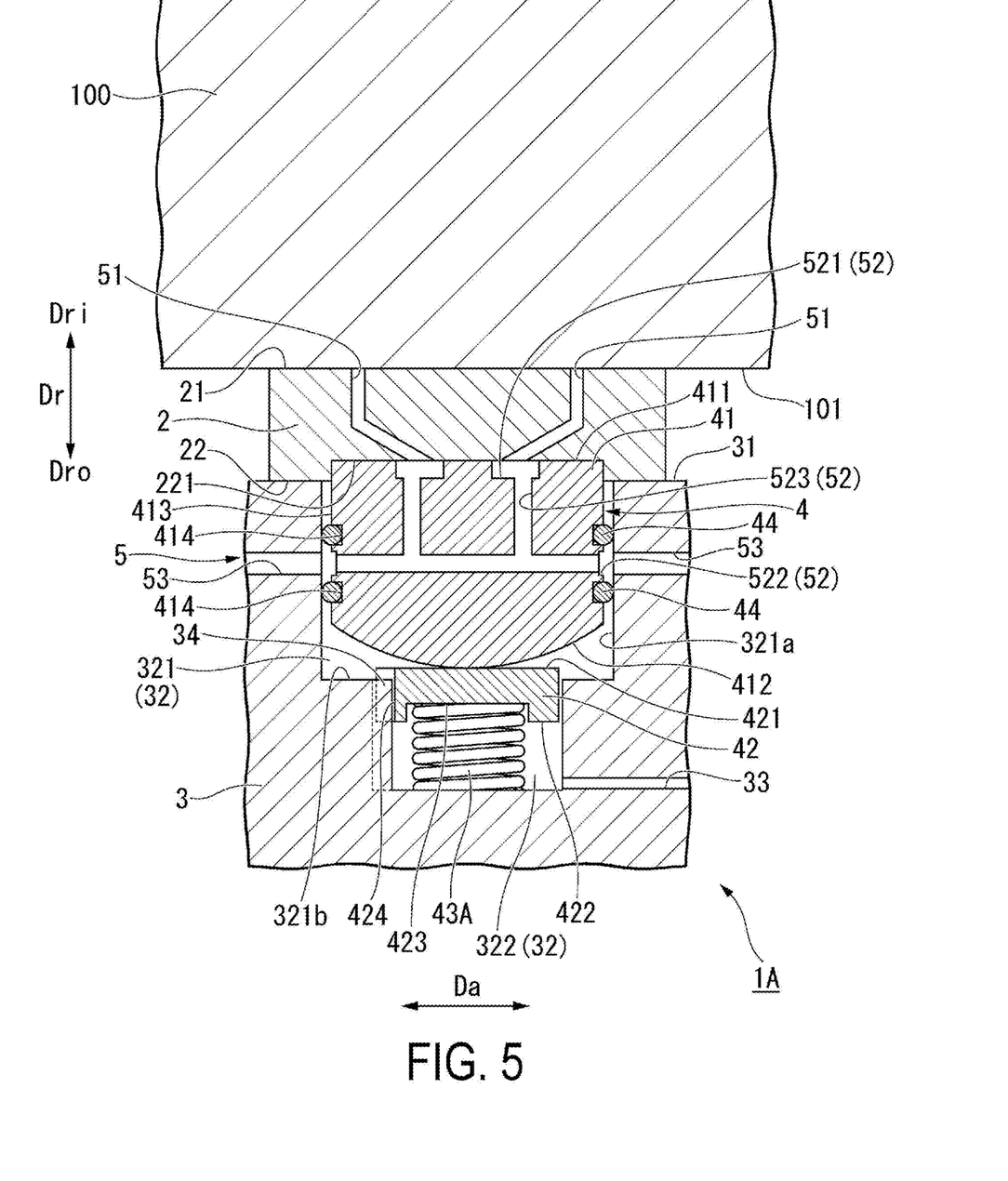
FIG. 5 is a cross-sectional view of a main part illustrating a configuration around a pad of a second embodiment, viewed from a circumferential direction.

As illustrated in FIG. 5, in a tilting pad bearing 1A of the second embodiment, a biasing member 43A is one spring washer accommodated in the liner accommodating recess 423. The spring washer is formed to have no length in the radial direction Dr as compared with the disc spring of the first embodiment. Therefore, the second accommodating recess 322 is formed deeper in the radial direction Dr than in the first embodiment.

As described above, use of a spring washer as the biasing member 43A enhances the spring force and the rigidity as compared with a case of use of one disc spring as the biasing member 43. This makes it possible to increase the force for biasing the liner 42 with respect to the housing 3 while increasing the strength of the biasing member 43A. Use of the spring washer makes it possible to easily provide a member that biases the liner 42 toward the inner side Dri in the radial direction Dr with respect to the housing 3 as compared with the disc spring.

Third Embodiment

Next, the third embodiment of the tilting pad bearing according to the disclosure will be described. Note that in the following description of the third embodiment, components common to the first embodiment and the second embodiment described above are given the same reference sign in the drawings and explanations thereof are omitted.

Figure 6:
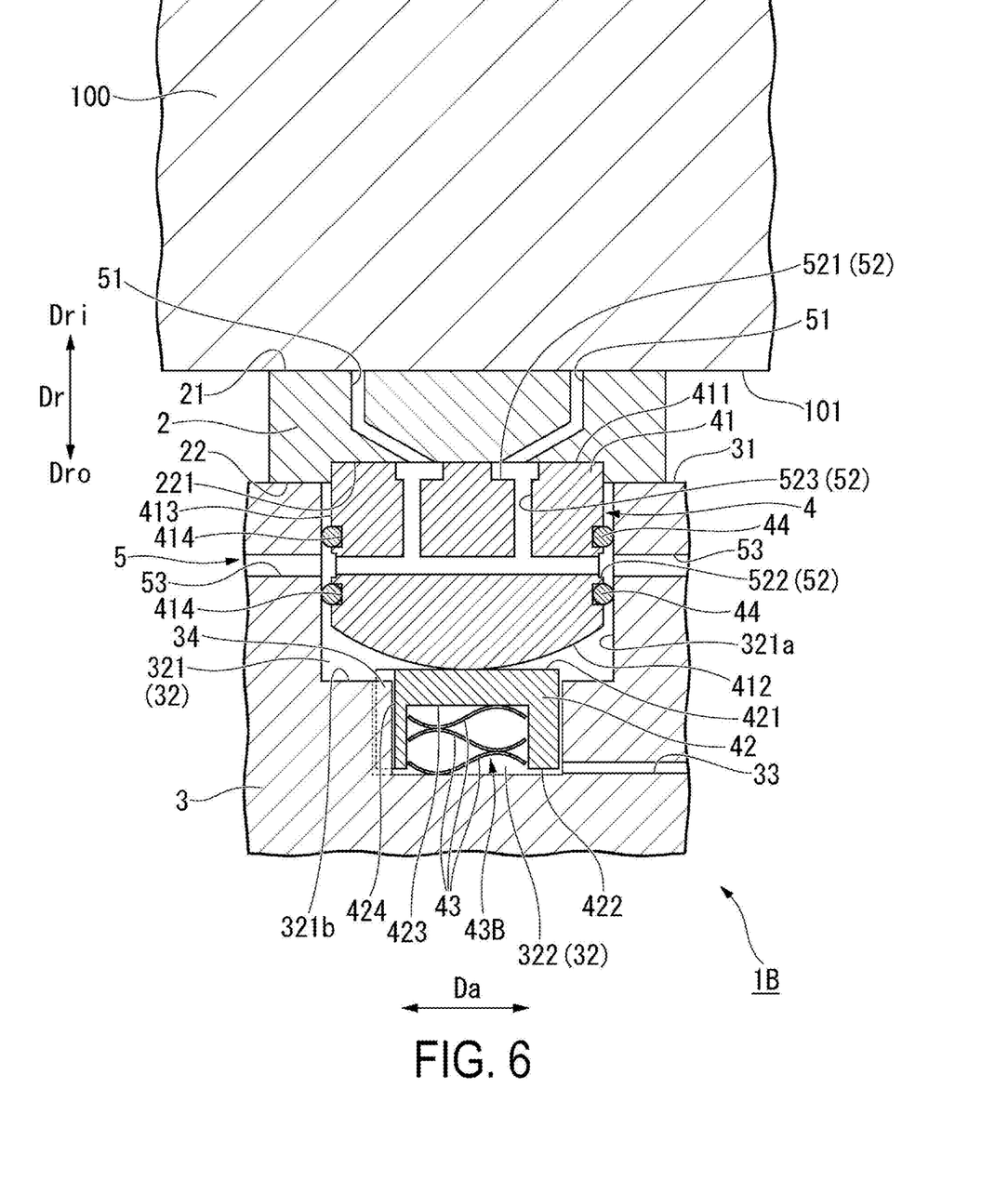
FIG. 6 is a cross-sectional view of a main part illustrating a configuration around a pad of a third embodiment, viewed from a circumferential direction.

As illustrated in FIG. 6, in a tilting pad bearing 1B of the third embodiment, a biasing member 43B is a plurality of (three in the present embodiment) disc springs accommodated in the liner accommodating recess 423. That is, a plurality of the biasing members 43 in the first embodiment are arranged. The plurality of disc springs are disposed so as to repel one another.

As described above, use of a plurality of disc springs as the biasing member 43B also enhances the spring force and the rigidity as compared with one disc spring. Furthermore, since the biasing member 43B includes a plurality of disc springs, the spring force and the rigidity can be adjusted by changing the number of disc springs.

OTHER EMBODIMENTS

An embodiment according to the disclosure has been described in detail with reference to the drawings. However, the specific configuration of the disclosure is not limited to this embodiment. Design change without departing from the main gist of the disclosure or the like is also included.

The number of pads 2 in the tilting pad bearings 1, 1A, or 1B is not limited to four as in the present embodiment. The number of the pads 2 may be three or less or five or more. At that time, the support portions 4 may be disposed corresponding to the respect pads 2.

The structure of the pad 2 is not limited to the structure of that in the present embodiment. As long as the pad 2 has the pad surface 21 and the pad outside surface 22, the pad 2 may have another structure or shape according to the structure of the rotor shaft 100 to be supported or the structure of the support portion 4.

The structure of the housing 3 is not limited to the structure of that in the present embodiment. For example, the housing accommodating recess 32 need not include the first accommodating recess 321 and the second accommodating recess 322.

The structure of the support portion 4 is not limited to the structure of that in the present embodiment. For example, the shapes of the pivot 41 and the liner 42 may be different from those of the present embodiment.

In the present embodiment, the support portion 4 has the same structure for all the pads 2, but the disclosure is not limited to the case where all the pads 2 are the same. For example, only the support portion 4 corresponding to the pad 2 disposed vertically above the axis O with respect to the rotor shaft 100 may have the biasing member 43.

The shape and configuration of the fluid supply unit 5 are not limited to those of the present embodiment as long as the fluid supply unit 5 can supply the fluid from the outside of the housing 3 to the pad surface 21. Therefore, the shapes of the pad flow channel 51, the pivot flow channel 52, and the housing flow channel 53 may be appropriately changed.

As in the present embodiment, the tilting pad bearing 1 is not limited to one that includes the seal member 44. Depending on the structure of the support portion 4 and the fluid supply unit 5, the tilting pad bearing 1 need not include the seal member 44.

Notes

The tilting pad bearings 1, 1A, or 1B described in the embodiments are understood as follows, for example.

(1) The tilting pad bearing 1, 1A, or 1B according to a first aspect includes: the plurality of pads 2 including the pad surface 21 slidably supporting the outside surface 101 of a rotor shaft that rotates about the axis O; the housing 3 formed in an annular shape about the axis O, covering the plurality of pads 2; the support portion 4 disposed between the housing 3 and the pads 2 in the radial direction Dr with reference to the axis O and supporting the pads 2 swingably with respect to the housing 3; and the fluid supply unit 5 configured to supply a fluid from an outside of the housing 3 to the pad surface 21, in which the pad 2 includes the pad outside surface 22 facing a side opposite to the pad surface 21 in the radial direction Dr, the housing 3 includes the housing accommodating recess 32 in which the support portion 4 can be accommodated, the support portion 4 includes the pivot 41 including the pad support surface 411 in contact with the pad outside surface 22 and the pivot curved surface 412 curved facing and protruding toward a side opposite to the pad support surface 411 in the radial direction Dr, the liner 42 disposed between the housing 3 and the pivot 41 and including the first liner surface 421 formed linearly and being in contact with the pivot curved surface 412, when viewed from the circumferential direction Dc about the axis O, and the biasing member 43, 43A, or 43B disposed between the liner 42 and the housing 3, biasing the liner 42 toward the pivot 41 with respect to the housing 3, and the fluid supply unit 5 includes the pad flow channel 51 formed, in the pad 2, opening on the pad surface 21, the pivot flow channel 52 formed, in the pivot 41, communicating with the pad flow channel 51, and the housing flow channel 53 formed, in the housing 3, communicating with the pivot flow channel 52.

In the tilting pad bearings 1, 1A, or 1B, the pivot curved surface 412 curved so as to protrude in the radial direction Dr is in contact with the first liner surface 421 that is linear when viewed from the circumferential direction Dc. As a result, the pivot 41 swings with respect to the liner 42 fixed to the housing 3. That is, the pivot 41 swings with respect to the housing 3. Therefore, the pads 2 supported with respect to the pivot 41 in a state where the pad outside surface 22 is in contact with the pad support surface 411 also swings with respect to the housing 3. Therefore, the pads 2 can be swingably supported with respect to the housing 3.

The biasing member 43, 43A, or 43B biases the liner 42 in the radial direction Dr with respect to the housing 3. As a result, the pivot 41 in contact with the liner 42 is also pressed toward the radial direction Dr. Due to this, the pad outside surface 22 is pressed in the radial direction Dr by the pad support surface 411. As a result, the pad 2 is pressed against the rotor shaft 101 such that the pad surface 21 approaches the outside surface 100 of the rotor shaft. This can reduce a gap between the pad surface 21 and the outside surface 101 of the rotor shaft. This can increase the rigidity of the bearing, and improve the stability of the rotor shaft 100 and reduce the axial vibration. Therefore, a structure that biases the pads 2 toward the rotor shaft 100 can be obtained with a simple structure.

The fluid supplied from the outside of the housing 3 is supplied to the pad surface 21 by the fluid supply unit 5. Therefore, at the start time, a fluid is present between the pad surface 21 and the outside surface 101 of the rotor shaft. Therefore, as compared with the state before the fluid is supplied, the pad surface 21 is separated from the outside surface 101 of the rotor shaft in the outer side Dro in the radial direction Dr by the interposition of the fluid. As a result, the pad surface 21 and the outside surface 101 of the rotor shaft are less likely to come into direct contact with each other, and wear and damage on the pads 2 and the rotor shaft 100 due to contact between the pad surface 21 and the outside surface 101 of the rotor shaft can be suppressed. Therefore, a structure that enables supply of a fluid to the pads 2 can be obtained with a simple structure. As described above, in the above-described tilting pad bearing 1, it is possible to achieve, with a simple structure, both a structure that enables supply of a fluid to the pads 2 and a structure that biases the pads 2 toward the rotor shaft 100.

(2) The tilting pad bearing 1, 1A, or 1B according to a second aspect is the tilting pad bearing 1, 1A, or 1B of (1), in which the pivot 41 includes the pivot side surface 413 facing a direction intersecting the pad support surface 411 and the pivot curved surface 412, the housing flow channel 53 supplies the fluid toward the pivot side surface 413, and the pivot flow channel 52 includes the pivot recess 521 recessed in the radial direction Dr from the pad support surface 411 and communicating with the pad flow channel 51, and the pivot internal flow channel 523 formed, in the pivot 41, causing the pivot recess 521 and the pivot side surface 413 to communicate with each other.

Due to this, by the housing flow channel 53, the fluid supplied to the pivot side surface 413 can be supplied to the pad support surface 411 through inside the pivot 41. Furthermore, the fluid is supplied to the pivot recess 521 recessed from the pad support surface 411 in contact with the pad outside surface 22. Therefore, before being supplied to the pad flow channel 51, the fluid fills the pivot recess 521 without leaking from between the pad outside surface 22 and the pad support surface 411. As a result, the fluid is continuously supplied to the pad flow channel 51 at a stable pressure. This makes it possible to continue to stably supply the fluid between the pad surface 21 and the outside surface 101 of the rotor shaft.

(3) The tilting pad bearing 1, 1A, or 1B according to a third aspect is the tilting pad bearing 1, 1A, or 1B of (2), in which the support portion 4 includes the pair of seal members 44 sealing a gap between the recess wall surface 321a forming the housing accommodating recess 32 and the pivot side surface 413, and when viewed from the circumferential direction Dc, the pair of seal members 44 are disposed in the housing accommodating recess 32 separately in the radial direction Dr with an opening of the pivot internal flow channel 523 in the pivot side surface 413 between the seal members 44.

Due to this, the fluid supplied from the housing flow channel 53 to the pivot side surface 413 is fed to the space sealed by the pair of seal members 44. This makes it possible to suppress the fluid supplied from the housing flow channel 53 to the pivot side surface 413 from filling the pad support surface 411, the pivot curved surface 412, the liner 42, and surrounding of the biasing member 43 in the housing accommodating recess 32. This makes it possible to suppress the positional relationship among the pivot 41, the liner 42, and the biasing member 43 from displacing due to the fluid supplied from the housing flow channel 53 to the pivot side surface 413. Therefore, the pad 2 can be stably supported with respect to the housing 3.

(4) The tilting pad bearing 1, 1A, or 1B according to a fourth aspect is the tilting pad bearing 1, 1A, 1B according to any one of (1) to (3), in which the liner 42 includes the second liner surface 422 facing a side opposite to the first liner surface 421 in the radial direction Dr, and the liner accommodating recess 423 which is recessed from the second liner surface 422 in the radial direction Dr and in which the biasing member 43, 43A, or 43B can be accommodated.

This can prevent the biasing member 43, 43A, or 43B from falling off from the liner 42. This enables the biasing member 43, 43A, or 43B to be continuously retained between the liner 42 and the housing 3 in a stable orientation. Therefore, the biasing member 43, 43A, or 43B can continuously bias the pivot 41 in a stable state.

(5) The tilting pad bearing 1 according to a fifth aspect is the tilting pad bearing 1 of (4), in which the biasing member 43 is a disc spring accommodated in the liner accommodating recess 423.

Due to this, the biasing member 43 can be formed thin in the radial direction Dr, and a simpler structure can be obtained.

(6) The tilting pad bearing 1B according to a sixth aspect is the tilting pad bearing 1 of (5), in which a plurality of the disc springs are stacked in the radial direction Dr in the liner accommodating recess 423.

As described above, use of a plurality of disc springs as the biasing member 43B also enhances the spring force and the rigidity as compared with one disc spring. Furthermore, since the biasing member 43 includes a plurality of disc springs, the spring force and the rigidity can be adjusted by changing the number of disc springs.

(7) The tilting pad bearing 1A according to a seventh aspect is the tilting pad bearing 1 of (4), in which the biasing member 43A is a spring washer accommodated in the liner accommodating recess 423.

This enhances the spring force and the rigidity as compared with a case of use of one disc spring as the biasing member 43. This makes it possible to increase the force for biasing the liner 42 with respect to the housing 3 while increasing the strength of the biasing member 43A. Use of the spring washer makes it possible to easily provide a member that biases the liner 42 toward the inner side Dri in the radial direction Dr with respect to the housing 3 as compared with the disc spring.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A tilting pad bearing comprising:
   a plurality of pads including a pad surface slidably supporting an outside surface of a rotor shaft that rotates about an axis;
   a housing, formed in an annular shape about the axis, covering the plurality of pads;
   a support portion disposed between the housing and the pads in a radial direction with reference to the axis and supporting the pads swingably with respect to the housing; and
   a fluid supply unit configured to supply a fluid from an outside of the housing to the pad surface,
   wherein the pad includes a pad outside surface facing a side opposite to the pad surface in the radial direction,
   the housing includes a housing accommodating recess in which the support portion is accommodated,
   the support portion includes:
      a pivot including a pad support surface in contact with the pad outside surface and a pivot curved surface facing and protruding toward a side opposite to the pad support surface in the radial direction,
      a liner disposed between the housing and the pivot and including a first liner surface formed linearly and being in contact with the pivot curved surface, and
      a biasing member, disposed between the liner and the housing, biasing the liner toward the pivot with respect to the housing, and
   the fluid supply unit includes:
      a pad flow channel formed in the pad and opening on the pad surface, a pivot flow channel formed in the pivot and communicating with the pad flow channel, and a housing flow channel formed in the housing and communicating with the pivot flow channel.

2. The tilting pad bearing according to claim 1, wherein the pivot includes a pivot side surface facing a direction intersecting the pad support surface and the pivot curved surface, the housing flow channel supplies the fluid toward the pivot side surface, and the pivot flow channel includes:
   a pivot recess recessed in the radial direction from the pad support surface and communicating with the pad flow channel, and
   a pivot internal flow channel formed in the pivot and causing the pivot recess and the pivot side surface to communicate with each other.

3. The tilting pad bearing according to claim 2, wherein the support portion includes a pair of seal members sealing a gap between a recess wall surface forming the housing accommodating recess and the pivot side surface, and when viewed from the circumferential direction, the pair of seal members are disposed in the housing accommodating recess and spaced apart along the radial direction with an opening of the pivot internal flow channel in the pivot side surface between the seal members.

4. The tilting pad bearing according to claim 1, wherein the liner includes a second liner surface facing a side opposite to the first liner surface in the radial direction, and a liner accommodating recess which is recessed from the second liner surface in the radial direction and in which the biasing member is accommodated.

5. The tilting pad bearing according to claim 4, wherein the biasing member is a disc spring accommodated in the liner accommodating recess.

6. The tilting pad bearing according to claim 5, wherein a plurality of the disc springs are stacked in the radial direction in the liner accommodating recess.

7. The tilting pad bearing according to claim 4, wherein the biasing member is a spring washer accommodated in the liner accommodating recess.

* * * * *